United States Patent
Bursell

(10) Patent No.: US 9,251,115 B2
(45) Date of Patent: Feb. 2, 2016

(54) DYNAMIC CONFIGURATION IN CLOUD COMPUTING ENVIRONMENTS

(71) Applicant: Citrix Systems, Inc., Fort Lauderdale, FL (US)

(72) Inventor: Michael Bursell, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 260 days.

(21) Appl. No.: 13/788,445

(22) Filed: Mar. 7, 2013

(65) Prior Publication Data

US 2014/0258446 A1    Sep. 11, 2014

(51) Int. Cl.
G06F 15/173 (2006.01)
G06F 15/177 (2006.01)
G06F 9/50 (2006.01)
G06F 15/16 (2006.01)
H04L 12/28 (2006.01)
G06F 9/455 (2006.01)

(52) U.S. Cl.
CPC ............ *G06F 15/177* (2013.01); *G06F 9/5072* (2013.01); *G06F 9/5077* (2013.01)

(58) Field of Classification Search
CPC .... G06F 15/177; G06F 9/5072; G06F 9/5077
See application file for complete search history.

(56) References Cited

U.S. PATENT DOCUMENTS

| 8,615,579 | B1* | 12/2013 | Vincent ................. | G06F 9/4856 709/223 |
|---|---|---|---|---|
| 2006/0143617 | A1 | 6/2006 | Knauerhase et al. | |
| 2010/0050172 | A1 | 2/2010 | Ferris | |
| 2010/0082322 | A1* | 4/2010 | Cherkasova et al. ............ | 703/22 |
| 2010/0083248 | A1* | 4/2010 | Wood et al. ........................ | 718/1 |
| 2010/0138829 | A1* | 6/2010 | Hanquez et al. ................... | 718/1 |
| 2011/0185064 | A1* | 7/2011 | Head et al. ..................... | 709/226 |
| 2011/0213686 | A1* | 9/2011 | Ferris et al. ..................... | 705/34 |
| 2011/0255538 | A1* | 10/2011 | Srinivasan et al. ............ | 370/392 |
| 2012/0124667 | A1* | 5/2012 | Chiang et al. ................... | 726/24 |
| 2012/0233609 | A1 | 9/2012 | Blythe et al. | |
| 2012/0324112 | A1* | 12/2012 | Dow et al. ..................... | 709/226 |
| 2013/0007254 | A1 | 1/2013 | Fries | |
| 2013/0007265 | A1 | 1/2013 | Benedetti et al. | |
| 2014/0229944 | A1* | 8/2014 | Wang et al. ....................... | 718/1 |
| 2015/0172211 | A1* | 6/2015 | Bello ................ | H04L 29/06537 709/226 |

OTHER PUBLICATIONS

Erik Elmroth, et. al, "Accounting and Billing for Federated Cloud Infrastructures", Aug. 2009, Eighth International Conference on Grid and Cooperative Computing, 2009. GCC '09, pp. 268-275.*

(Continued)

*Primary Examiner* — Wen-Tai Lin
(74) *Attorney, Agent, or Firm* — Banner & Witcoff, Ltd.

(57) ABSTRACT

Virtual machines, virtualization servers, and other physical resources in a cloud computing environment may be dynamically configured based on the resource usage data for the virtual machines and resource capacity data for the physical resources in the cloud system. Based on an analysis of the virtual machine resource usage data and the resource capacity data of the virtualization servers and other physical resources in the cloud computing environment, each virtual machine may be matched to one of a plurality of virtualization servers, and the resources of the virtualization servers and other physical resources in the cloud may be reallocated and reconfigured to provide additional usage capacity to the virtual machines.

20 Claims, 10 Drawing Sheets

(56) References Cited

OTHER PUBLICATIONS

Mayank Misha et al.: "Dynamic resource management using virtual machine migrations", IEEE Comminications Magazine, IEEE Service Center, Piscataway, US, vol. 50, No. 9, Sep. 2012, pp. 34-40, XP011460159, ISSN: 0163-6804, DOI: 10.1109/MCOM.2012.6295709; the whole document.

Mukil Kesavan et al.: "Active Coordination (ACT)—toward effectively managing virtualized multicore clouds", Cluster Computing, 2008 IEEE International Conference on, IEEE, Piscataway, NJ, USA, Sep. 29, 2008, pp. 23-32, XP031355604, ISBN: 978-1-4244-2639-3 paragraph [IV.A]—paragraph [IV.B].

* cited by examiner

| Current Virtual Machine Resource Usage ||||||
|---|---|---|---|---|---|
| VM ID | Processor | RAM | Proc. Usage | Memory Usage | Bandwidth Usage |
| VM1 | 2.4 Ghz, Quad Proc | 1 GB | 28% | 5.7 GB | 32 MB / day |
| VM2 | 4 Ghz, Dual Proc | 2 GB | 5.6% | 15.2 GB | 327 MB / day |
| VM3 | 1.5 Ghz, Dual Proc | 512 MB | 65% | 2.1 GB | 112 MB / day |
| VM4 | 4 Ghz, Dual Proc | 2 GB | 9% | 462 GB | 89 MB / day |

FIG. 8A

| Anticipated Virtual Machine Resource Usage ||||||
|---|---|---|---|---|---|
| VM ID | VM Profile | VM Size | Proc. Type / Usage | Memory Usage | Bandwidth Usage |
| VM1 | Application Server | Medium | 4 Ghz, Dual (20%) | 10 GB | 50 MB / day |
| VM2 | Web Server | Large | 2 Ghz, Quad (5%) | 20 GB | 600 MB / day |
| VM3 | Graphics Server | Small | 4 Ghz, Dual (35%) | 5 GB | 150 MB / day |
| VM4 | Database Server | Large | 2 Ghz, Quad (15%) | 800 GB | 150 MB / day |

FIG. 8B

DYNAMIC CONFIGURATION IN CLOUD COMPUTING ENVIRONMENTS

FIELD

This application generally relates to computer virtualization, and creating and managing virtual machines. In particular, aspects of this application relate to configuring virtual machines, virtualization servers, and other physical resources in a cloud computing environment.

BACKGROUND

Traditionally, personal computers include combinations of operating systems, applications, and user settings, each of which is managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual machines and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of virtualization servers, storage disks, networking hardware, and other physical resources that may be used to provision and execute virtual machines, along with additional computing devices to provide management and customer portals for the cloud system. Cloud systems may create and manage virtual machines for customers over a network, providing remote customers with computational resources, data storage services, networking capabilities, and computer platform and application support. For example, a customer in a cloud system may request the creation of one or more virtual machines having specified capabilities (e.g., processor capacity, disk storage, bandwidth). Within the cloud system, a resource manager may select virtualization servers (or host servers) to host the new virtual machines, and may provision and create the new virtual machines using the resources of the host servers and other physical resources within the cloud computing environment (e.g., storage disks, network devices).

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Aspects herein describe systems and methods related to the configuration of virtual machines, virtualization servers, and other physical resources in a cloud computing environment. According to certain aspects of the disclosure, resource usage levels or amounts may be determined for one or more virtual machines running in a cloud computing environment. A resource usage level may correspond to an amount of current or anticipated usage of a physical resource (e.g., processor usage, memory usage, network usage, etc.) by a virtual machine running in the cloud computing environment. Resource capacity amounts also may be determined for the physical resources within the cloud computing environment. Using the determined resource usage amounts for the virtual machines and the resource capacity amounts for the physical resources, the cloud computing environment may be dynamically configured to allocate different virtualization servers and/or different physical resources for running the virtual machines.

According to additional aspects of the disclosure, a plurality of different virtual machines may be matched to one of a plurality of different virtualization servers (or host servers) based on an analysis of the virtual machine resource usage data and the resource capacity data of the virtualization servers, and the virtualization servers may be dynamically reconfigured to execute the matching virtual machines. The resources of the virtualization servers and other physical resources in the cloud may be reallocated and reconfigured to provide additional resource availability to virtual machines, update network traffic policies, and perform additional reconfiguration and tuning of the cloud computing environment. According to additional aspects, virtual machines may be profiled based on resource usage amounts, and anticipated future resource usage data may be determined and used to dynamically reconfigure the cloud computing environment. Additionally, cloud customers may receive offers to change predetermined resource allocations and service level agreements, and may receive notifications regarding changes in the resource usage amounts of their virtual machines.

BRIEF DESCRIPTION OF THE DRAWINGS

Figure 1:
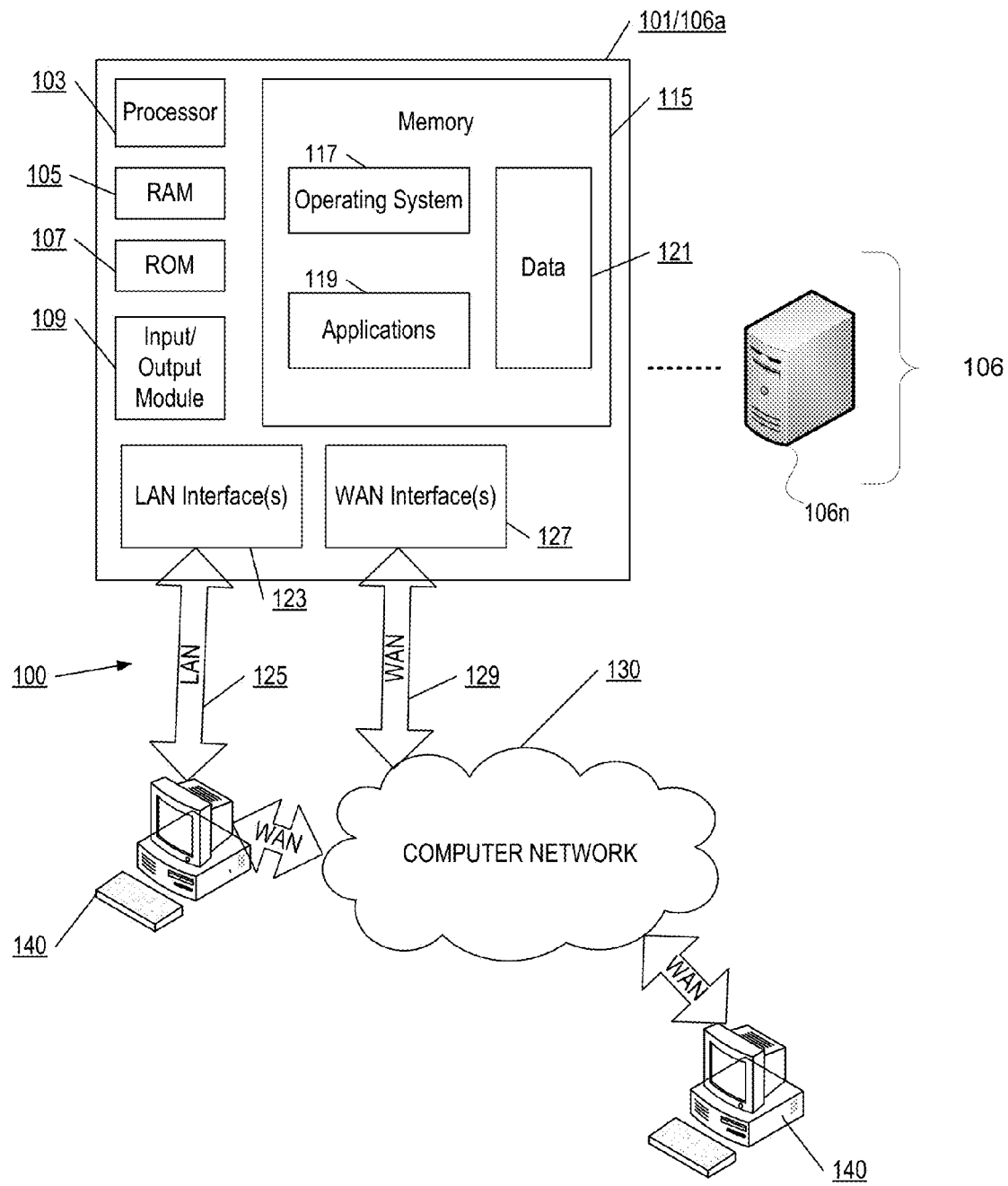

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
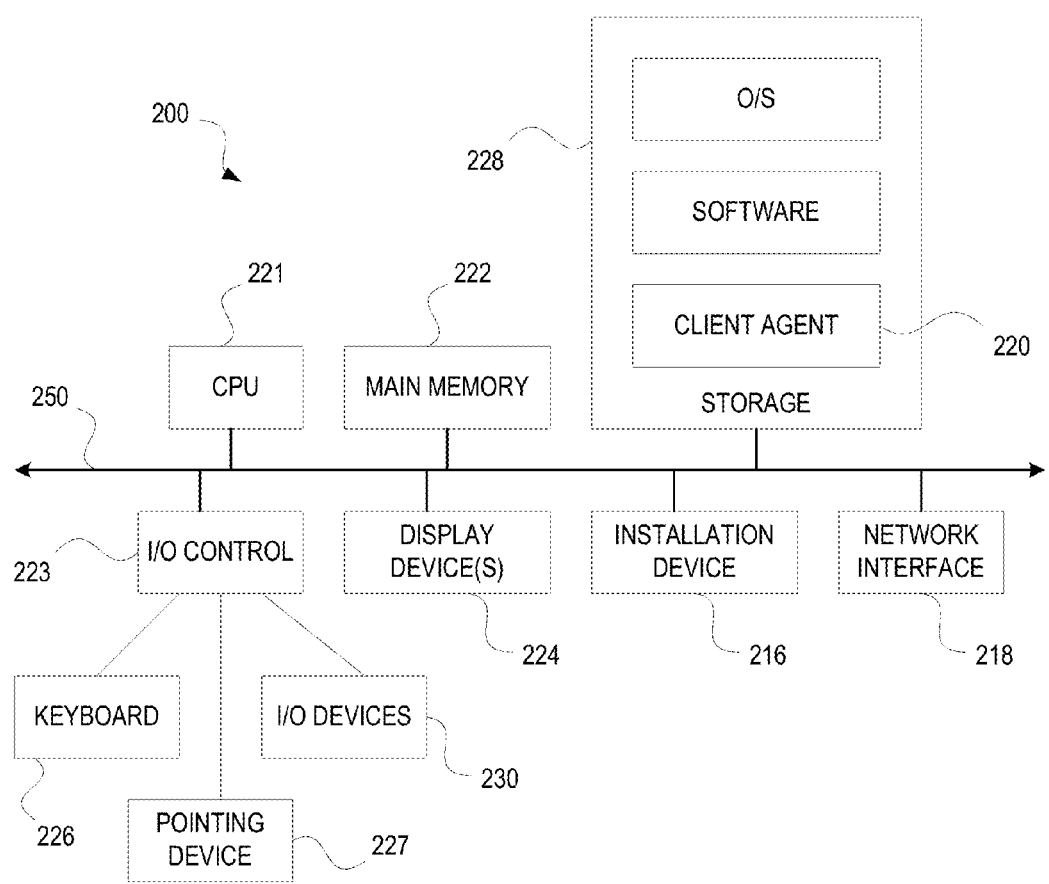

FIG. 2 illustrates a computing device that may be used in accordance with one or more illustrative aspects described herein.

Figure 3:
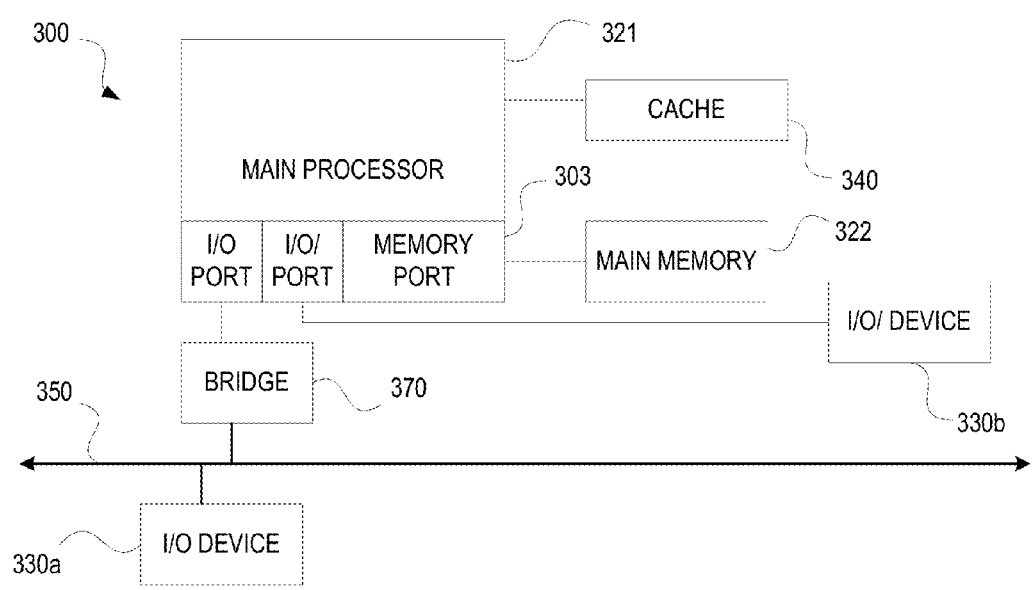

FIG. 3 illustrates a computing device that may be used in accordance with one or more illustrative aspects described herein.

Figure 4:
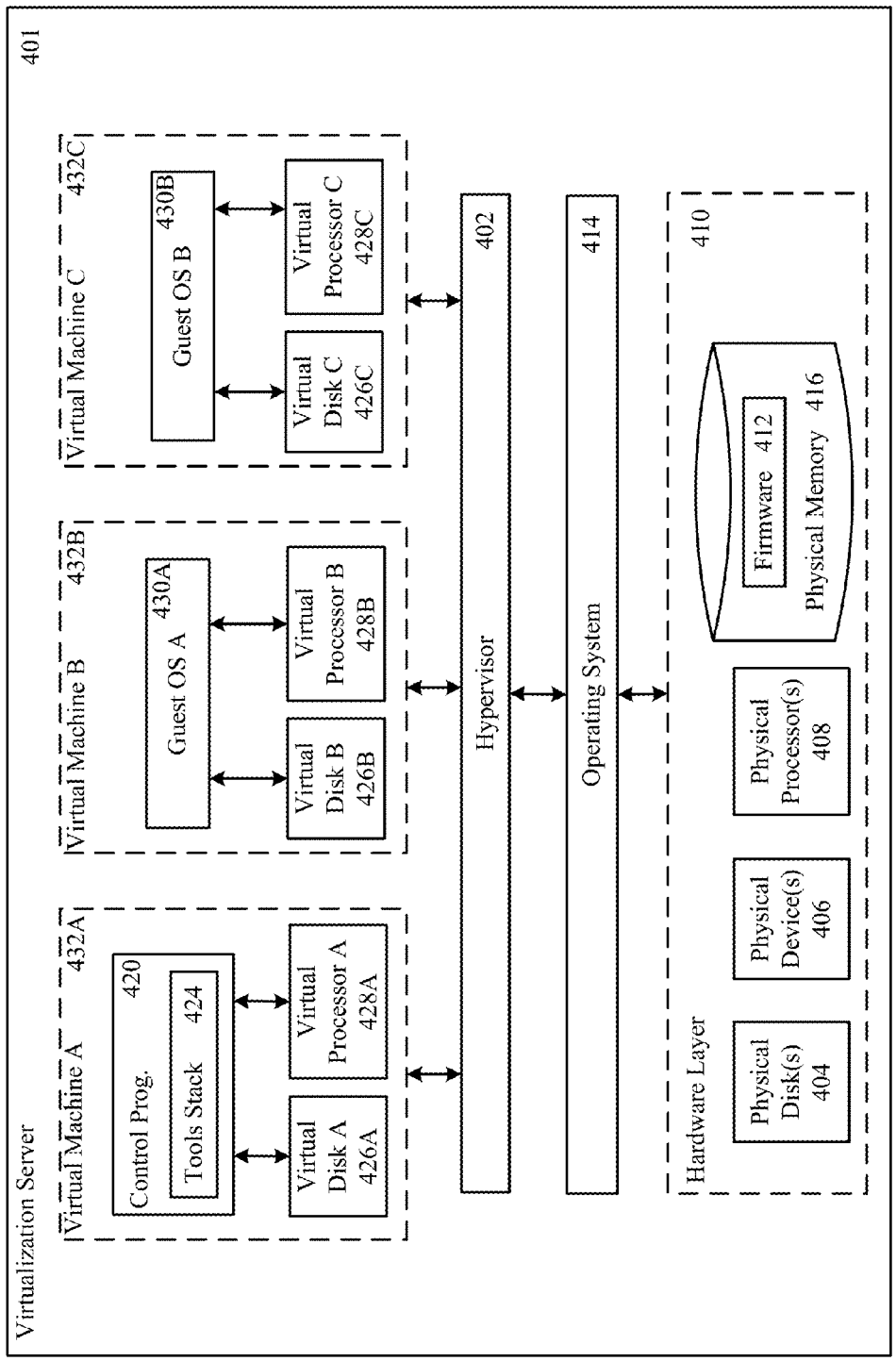

FIG. 4 is a block diagram that depicts embodiments of a virtualization server in accordance with one or more illustrative aspects described herein.

Figure 5:
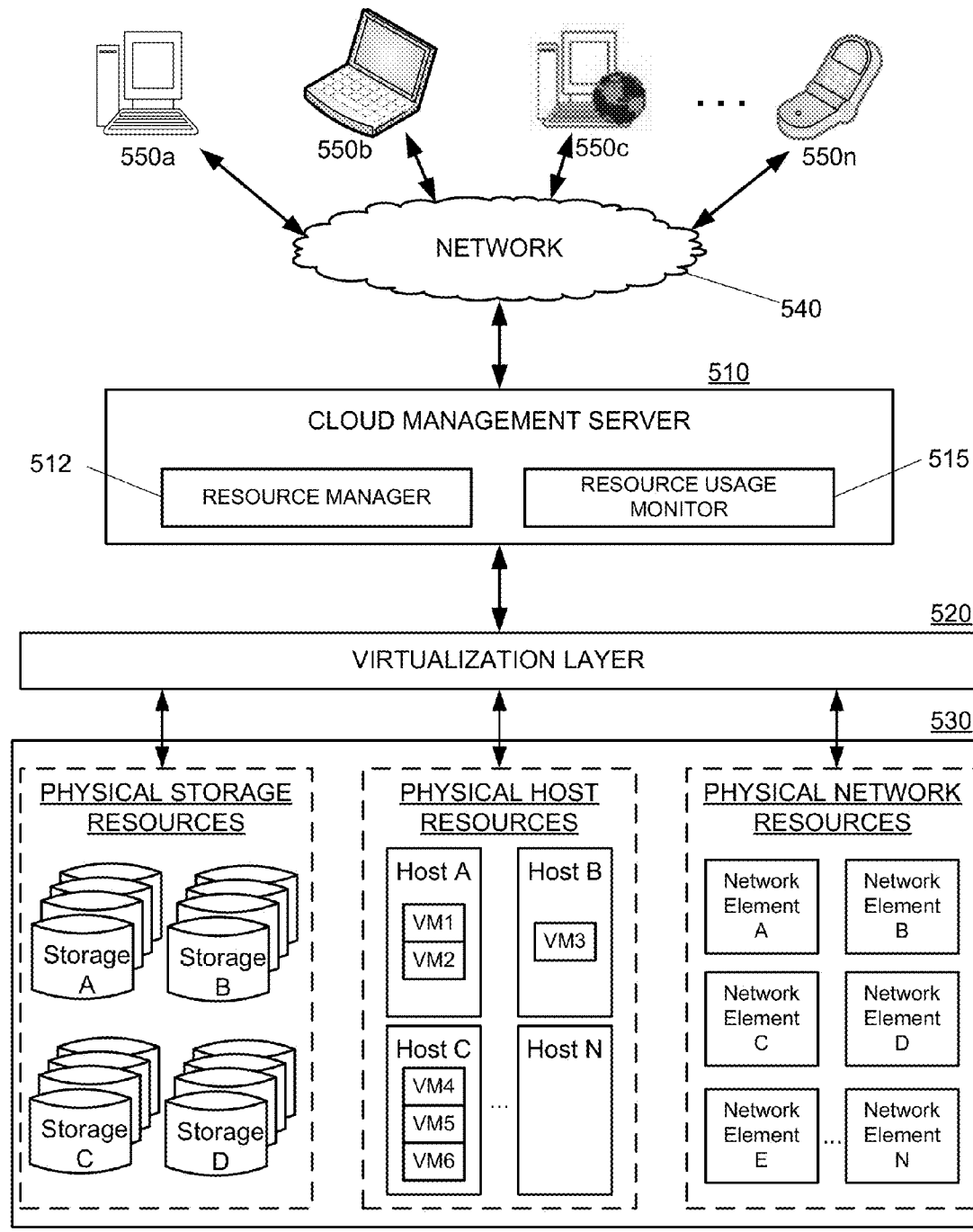

FIG. 5 illustrates a block diagram that depicts embodiments of a cloud computing environment in accordance with one or more illustrative aspects described herein.

Figure 6:
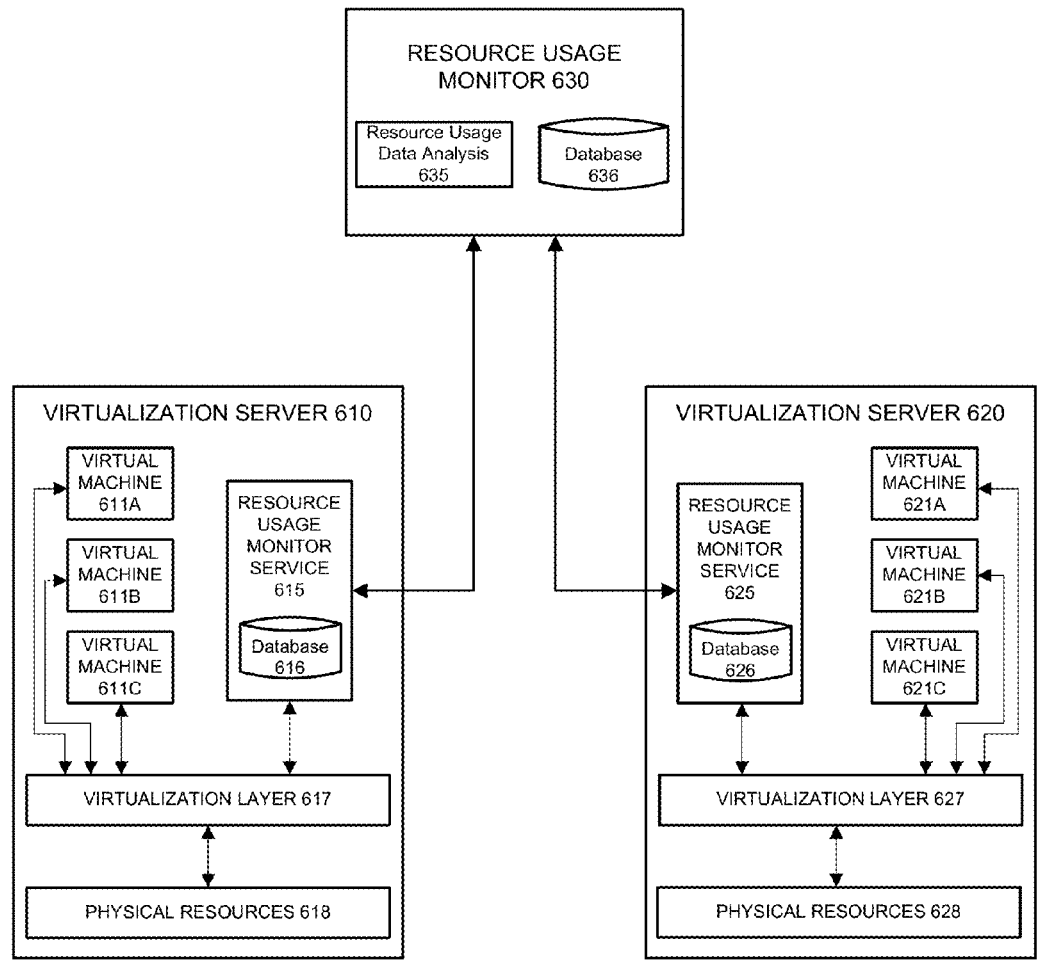

FIG. 6 is a block diagram illustrating certain components used for monitoring and analyzing resource usage in virtualization servers in a cloud computing environment, in accordance with one or more illustrative aspects described herein.

Figure 7:
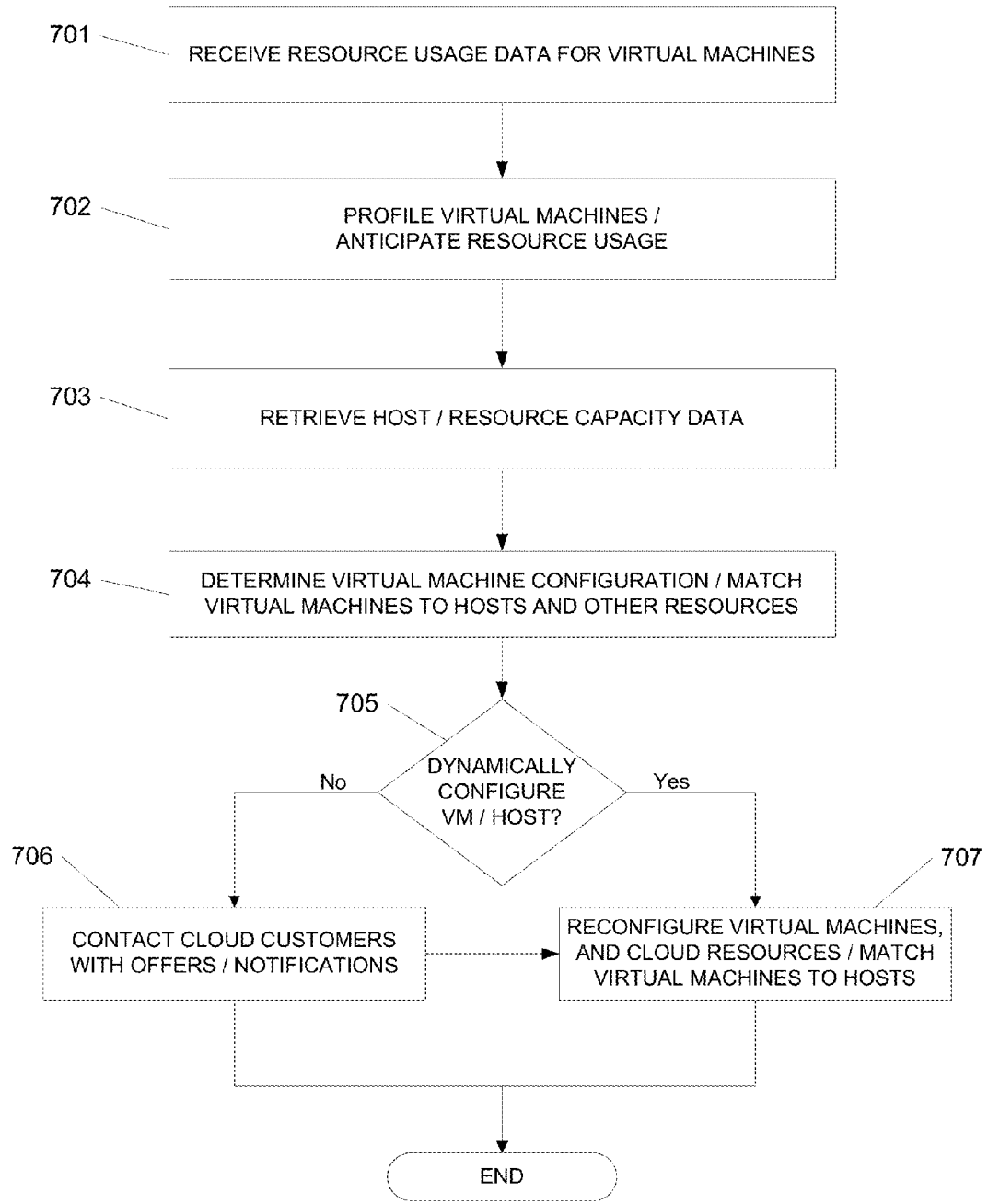

FIG. 7 is a flow diagram illustrating an example process of dynamically configuring virtual machines and virtualization servers based on resource usage and resource capacity in a cloud computing environment, in accordance with one or more illustrative aspects described herein.

FIGS. 8A and 8B are example tables showing sample data for current resource usage and anticipated resource usage for a set of virtual machines, in accordance with one or more illustrative aspects described herein.

Figure 9A:
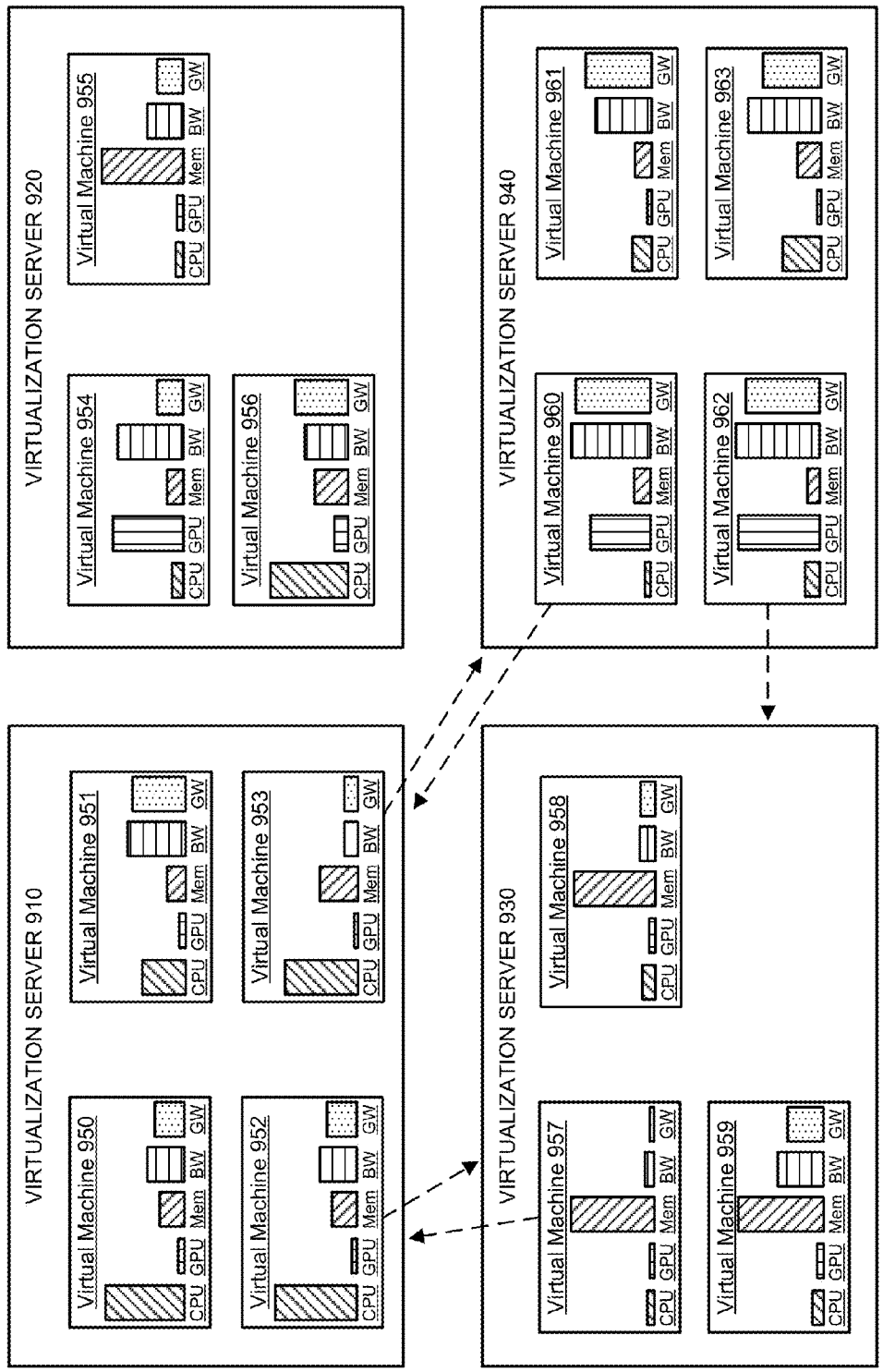

FIG. 9A is a diagram illustrating resource usage data of virtual machines in a cloud computing environment before an example dynamic configuration process, in accordance with one or more illustrative aspects described herein.

Figure 9B:
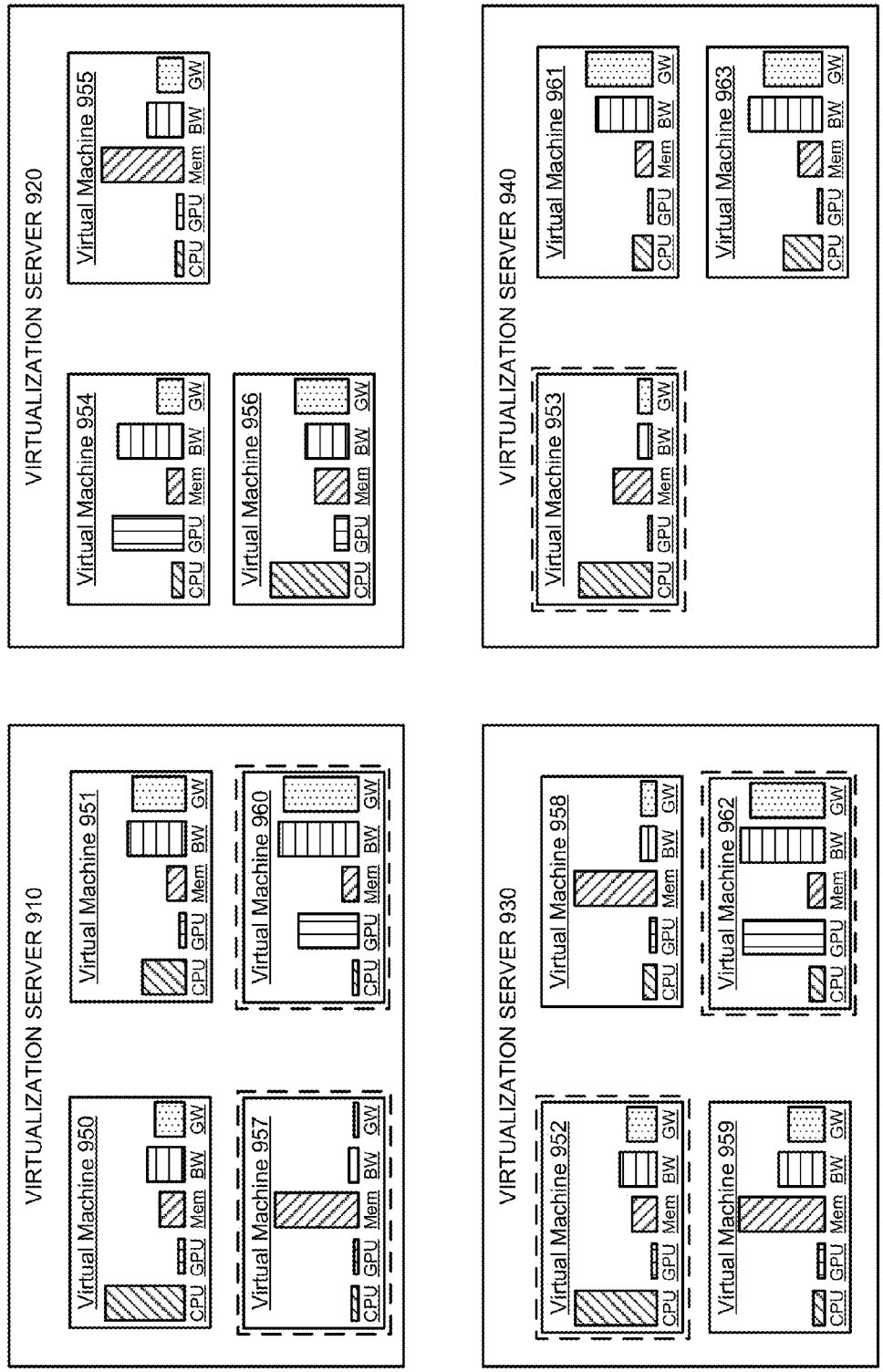

FIG. 9B is a diagram illustrating resource usage data of virtual machines in a cloud computing environment after an example dynamic configuration process, in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

For purposes of reading the description of the various embodiments below, the following descriptions of the sections of the specification and their respective contents may be helpful: Section A describes a network environment and computing environment which may be useful for practicing embodiments described herein; Section B describes embodiments of systems including a virtualization environment which may be useful for practicing embodiments described herein; and Section C describes embodiments of systems and methods relating to monitoring resource usage and dynamically configuring virtual machines, hosts, and other resources in cloud computing environment.

A. Network and Computing Environment

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, mobile phones, smartphones, PDAs, notebook computers, tablet computers, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; a web server; a proxy server; an appliance; a network appliance; a gateway; an application gateway; a gateway server; a virtualization server; a deployment server; a SSL VPN server; a firewall; an application server or a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, and possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc.; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server (or host) 106 configured to provide virtual machines and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted). Reference herein to specific systems, software, applications, devices, or brands is not meant to be limiting in any respect, and instead should be used to define a genre or category of products that may also or alternatively be used.

B. Systems Including Virtualization Environments

Illustrated in FIG. 4 is one embodiment of a computer device 401 configured as a virtualization server (or host server) in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g., optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program that executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks 404; physical processors 408; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may execute a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may present at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing machine. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

C. Monitoring Resource Usage and Dynamically Configuring Virtual Machines, Hosts, and Other Resources FIG. 5 illustrates an example of a cloud computing environment (or cloud system). As seen in FIG. 5, client computers 550a-550n may communicate with a cloud management server 510 via a network 540 to access the computing resources 530 (e.g., physical host servers, physical storage resources, and physical network resources) of the cloud system. For example, the cloud system in FIG. 5 may be configured to provision, create, and manage virtual machines and their operating environments (e.g., hypervisors, storage resources, services offered by the network elements, etc.) for customers at client computers 550a-550n, over a network 540 (e.g., the Internet), to provide customers with computational resources, data storage services, networking capabilities, and computer platform and application support. Cloud systems also may be configured to provide various specific services, including security systems, development environments, user interfaces, and the like.

Management server 510 may be implemented on one or more physical servers. The management server 510 may run, for example, CLOUDSTACK by Citrix Systems, Inc. of Ft. Lauderdale, Fla., or OPENSTACK. Management server 510 may manage various computing resources, including cloud hardware and software resources, for example, host computers, data storage devices, and networking devices. The cloud hardware and software resources may include private and/or public components. For example, a cloud may be configured as a private cloud to be used by one or more particular customers or client computers 550a-550n and/or over a private network. In other embodiments, public clouds or hybrid public-private clouds may be used by other customers over an open or hybrid networks.

Cloud systems may include an arrangement of various physical hardware components 530, for example, physical host resources (or physical computing resources), physical network resources, physical storage resources, switches, and additional hardware resources that may be used to provide cloud computing service to customers. The physical host resources in a cloud computing environment may include one or more host computer servers, such as the virtualization servers 401 described above, which may be configured to create and host virtual machine instances. As illustrated in this example, each host machine may host a single virtual machine, or multiple different virtual machines from a single customer or different customers. The physical network resources may include one or more network service providers (e.g., network elements) comprising hardware and/or software which are configured to provide a network service to cloud customers, for example, firewalls, network address translators, load balancers, virtual private network (VPN) gateways, Dynamic Host Configuration Protocol (DHCP) routers, and the like. The storage resources in the cloud system may include storage disks (e.g., solid state drives (SSDs), magnetic hard disks, etc.) and other storage devices.

In certain embodiments, cloud systems may include a virtualization layer 520 with additional hardware and/or software resources configured to create and manage virtual machines and provide other computing services to customers with the physical resources 530 in the cloud. The virtualization layer 520 may include hypervisors, as described above in FIG. 4, along with other specialized components to provide network virtualizations, storage virtualizations, etc. Although FIG. 5 shows the virtualization layer 520 as a separate layer from the physical resource layer 510, in some embodiments these layers may share some or all of the same hardware and/or software resources. For example, the virtualization layer 520 may include hypervisors installed on each of the virtualization servers with the physical host resources.

The cloud management server 510 may include one or more hardware and software components that provide the interfaces through which cloud operators or administrators, and cloud customers, may interact with the cloud system. For example, the cloud management server 510 may include a resource manager 512 and a resource usage monitoring system 515, discussed below. One or more cloud operator console applications also may be included in the cloud management server 510 with user interfaces configured to allow cloud operators to manage cloud resources 530, configure the virtualization layer 520, manage customer accounts, and perform other cloud administration tasks. The cloud management server 510 also may include one or more customer console applications with user interfaces configured to receive cloud computing requests from customers via client computers 550a-550n, such as, requests to create, modify, or delete virtual machine instances, requests for cloud data storage, network services, etc.

A resource manager component 512 within a cloud management system 510 may be configured to select and/or provision physical resources in the hardware layer 530 to be allocated to virtual machines. For example, after receiving a customer request via to create one or more new virtual machines, the resource manager 512 may determine the physical virtualization server (or host), physical storage disk(s), and physical network element(s) to use when creating the new virtual machines. In some cases, the amount of the physical resources to be allocated (e.g., processing capacity, RAM, disk storage, network bandwidth, network latency, etc.) may be pre-determined by a contract or a service level agreement (SLA) between the cloud system and the customer requesting the virtual machines. For example, when requesting a new virtual machine, the customer may pay for a specific allocation of resources or a guarantee of a minimum performance level for the new virtual machine. In other cases, virtual machines may be created without a contract, SLA, or any other guarantee of the amount of the physical resources or performance levels to be allocated to the virtual machines. In such cases, the resource manager 512 may select the virtualization servers and determine the other physical resources in an attempt to provide sufficient or equitable resources to all virtual machines in the cloud system.

The determination of the specific hardware resources may be based on a number of factors, for example, the physical location of the resources (e.g., a zone or datacenter), the performance characteristics of the resources (e.g., speed and reliability), the type of computing service requested (e.g., a virtual web server, a virtual database server, a virtual application server, etc.), the current capacity of the resources (e.g., a number of existing virtual machine instances on the host server, an amount of available disk space on a storage resource), and other factors. After determining the specific hardware resources to be used, the resource manager 512 may communicate with the appropriate components within the virtualization layer 520 to provision and instantiate the new virtual machines and their operating environments, and any other cloud computing requests, using the selected resources. Additionally, in some embodiments, certain physical hardware components 530 (e.g., physical host, network, and storage resources) may be configured directly by the cloud management server 510, instead of going through the virtualization layer 520.

A cloud management system 510 also may include a resource usage monitor component 515 configured to monitor the usage of the physical resources 530 in the cloud system by virtual machines. As discussed below, the virtualization servers (or hosts) and other resources in the cloud system may be configured to communicate with the resource usage monitor 515 to transmit physical resource usage data and/or availability data for their respective physical resources. Physical resource usage data may include information indicating the amounts (as percentages or absolute amounts) of a physical resource being used at a particular time (or over a period of time) by the different virtual machines using the physical resource. For example, the resource usage monitor 515 may receive or determine usage data regarding processor usage, RAM usage, disk usage, network bandwidth usage, firewall usage, load balancer usage, gateway usage, router usage, etc., by different virtual machines running within the cloud system. Such usage data may take the form of averages, maximums, and/or minimums over a period a time. In certain embodiments, the resource usage monitor 515 may receive or determine resource availability levels, alternatively or in addition to resource usage levels, corresponding to amounts of unused physical resources within the cloud system at particular times.

In the example shown in FIG. 5, the resource manager 512 and the resource usage monitor 515 are implemented within the cloud management server 510. However, in other examples, the resource manager 512 and resource usage monitor 515 may be implemented at other locations, such as within virtualization servers or at other computing devices within the cloud system.

FIG. 6 is a block diagram illustrating certain components that may be used for monitoring and analyzing resource usage in virtualization servers in a cloud computing environment, in accordance with one or more illustrative aspects described herein. In this example, a resource usage monitor 630 is configured to communicate with virtualization servers 610 and 620 to receive resource usage data regarding the virtual machines executing on the virtualization servers. The virtualization servers 610 and 620 in this example each have three currently running virtual machines 611a-611c and 621a-621c. Each virtualization server 610 and 620 also includes a virtualization layer 617 and 627 and a set of physical resources 618 and 628, as described above in reference to FIGS. 4 and 5.

The virtualization servers 610 and 620 in FIG. 6 also include resource usage monitor services 615 and 625 configured to receive and store resource usage data. Resource usage data may include any of the data described above relating to the usage of physical resources by the virtual machines 611 and 621 executing on the virtualization servers 610 and 620 (e.g., processor usage data, memory usage, network resource usage data, etc.) In this example, the resource usage monitor services 615 and 625 may be implemented as software services configured to communicate with components in the virtualization layers 617 and 627 to determine the amounts of physical resource usage by the virtual machines 611 and 621. In other examples, resource usage monitor services 615 and 625 may be implemented with various combinations of hardware and software components, and may receive resource usage data from the virtual machines 611 and 621, and/or directly from the physical resources 618 and 628. For instance, the resource usage monitor services 615 and 625 may be implemented as hardware and/or software components capable of directly monitoring the physical resources 618 and 628, and identifying which virtual machines are using the resources, without needing to communicate with the virtualization layers 617 and 627 or with virtual machines 611 and 621.

In this example, resource usage monitor service 615 and 625 include databases 616 and 626 that may be configured to store the resource usage data for the virtual machines 611 and 621. The resource usage data from virtualization servers 610 and 620, along with any other virtualization servers and/or other physical resources in the cloud system, then may be transmitted to the resource usage monitor 630 and stored in a central resource usage database 636. Resource usage data may be stored locally in the virtualization servers 610 and 620 and periodically transmitted to the resource usage monitor 630 according to a predetermined schedule. In other examples, the resource usage monitor 630 may request updated data from the virtualization servers 610 and 620 in response to an event occurring within the cloud system, such as a request by a customer to create a new virtual machine or allocate additional resources to an existing virtual machine.

The resource usage monitor 630 includes a database 636 for storing resource usage data received from the virtualization servers 610 and 620, and includes a data analysis component 635 to analyze the data. As discussed further below, the resource usage data may be analyzed in order to perform dynamic configuration of the virtual machines, virtualization servers, and other physical resources executing within the cloud computing environment. As used herein, dynamic configuration refers to a configuration or reallocation of resources relating to a virtual machine that may occur during the execution life cycle of the virtual machine.

In some embodiments, the analysis of the resource usage data and the dynamic configuration of virtual machines and hosts need not occur at a central system within the cloud computing environment, such as the resource usage monitor 630. For example, a resource usage monitor service 615 executing on a virtualization server 610 (or host) may be configured to receive and analyze data for the virtual machines 611 running on that virtualization server 610. The resource usage monitor service 615 may then dynamically configure the virtual machines 611a-611c on that virtualization server 610, without needing to communicate with any other virtualization servers or with any central resource manager or monitoring system within the cloud computing environment. Thus, a resource usage monitor service 615 in a virtualization server 610 may be configured to reconfigure or reallocate CPU's or processing capacity, RAM, network bandwidth, etc., to its virtual machines 611, without needing to communicate with any external computing devices or components.

In other embodiments, as shown in FIG. 6, a central resource usage monitor 630 may be used to analyze resource usage data and dynamically configure virtual machines 611 and 621 in multiple different virtualization servers 610 and 620. In some examples, a single virtual machine may use resources from multiple different virtualization servers and/or other separate physical devices. In such examples, the set of resources used by a single virtual machine might not be known to any one virtualization server, but may be determined only by analyzing the resource usage data from each of the virtualization servers used by the virtual machine. Additionally, as discussed below, dynamic configuration of virtual machines and hosts may include moving virtual machines from one virtualization server (or host) to a different virtualization server. In such cases, resource usage data from multiple different virtualization servers may be analyzed in order to determine efficient matchings between virtual machines and hosts.

FIG. 7 is a flow diagram illustrating an example process of dynamically configuring a set of virtual machines, virtualization servers (or hosts), and other physical resources in a cloud computing environment, based on resource usage and resource capacity. The steps of the example process in FIG. 7 may be performed by one or more data analysis components, for example, cloud management servers, resource managers, and resource usage monitors within a virtualization servers or management servers within the cloud system.

In step 701, resource usage data may be received corresponding to one or more virtual machines in a cloud computing environment. The resource usage data may correspond to a set of virtual machines within a single virtualization server, for example, to perform a dynamic configuration of the virtual machines and physical resources within the host. The resource usage data also may correspond to virtual machines executing within multiple different virtualization servers, for example, to perform dynamic configuration of virtual machines, host servers, and other cloud resources.

The data received in step 701 may represent usage amounts, levels, and/or statistics indicating usage by different virtual machines of any physical resource within the cloud computing environment. For example, usage data may correspond to any of the types of physical resources discussed above in reference to FIGS. 4-6 (e.g., processing resources, storage resources, network resources, etc.). The resource usage data for a virtual machine may be absolute usage amounts (e.g., total amounts of processing capacity, storage, or network element capacity), or relative usage amounts (e.g., percentages of processing capacity, storage, or network element capacity) used by the virtual machine within its host server. Additionally, the usage data may correspond to resource usage values for the virtual machines at a particular point in time, or resource usage averages by the virtual machines over a period of time.

In step 702, the resource usage data received in step 701 may be analyzed to identify virtual machine profiles (or classifications), and/or to anticipate future resource usage by the virtual machines. By analyzing by the previous and current resource usage data for a single virtual machine or a set of related virtual machines, a resource usage monitor or other management component may determine virtual machine profiles corresponding to the purposes of the virtual machines, and may then calculate anticipated future resource usage amounts for the virtual machines based on the current resource usage data and/or the determined profiles.

Referring briefly to FIG. 8A, an example table is shown including sample resource usage data for a set of virtual machines VM1-VM4 in rows 801-804. For each virtual machine, the table in FIG. 8A includes the processor type, amount of RAM, and percentage of processor capacity used by the virtual machine. In this example, the amount of disk memory usage by the virtual machine, and the amount of bandwidth used (per day) is also included. In addition to the sample data shown in this table, many other types of resource usage data may be received and analyzed in step 702, including any usage data or statistics for any of the physical resource types discussed herein.

Referring now to FIG. 8B, another example table is shown in which the virtual machines VM1-VM4 have been profiled into different virtual machine classifications and sizes in rows 805-808. To identify the virtual machine profiles and sizes, the resource usage monitoring system 630 or other component within the cloud computing environment may compare the relative (or absolute) amounts of physical resource usage of virtual machines to predetermined profiles or threshold values or ranges (e.g., processor usage thresholds, memory usage thresholds, network bandwidth thresholds, etc.). For example, the resource usage of virtual machine VM1 in the example table in FIG. 8A indicates that VM1 uses relatively high processing capacity, and a relatively low amount of memory and network bandwidth. This data may be analyzed and compared to usage threshold amounts and virtual machine profiles to determine that VM1 is a medium sized application server (see FIG. 8B, 805). Similarly, the usage data for VM2-VM4 may be analyzed to determine that these virtual machines are being used as large web server (see FIG. 8B, 806), a small graphics server (see FIG. 8B, 807), and a large database server (see FIG. 8B, 808), respectively. In other examples, a virtual machine's usage data for one or more processors, storage disks, network devices, and other various cloud resources, may indicate that the virtual machine is a voice-over-Internet Protocol (VoIP) server, a web proxy server, a video streaming server, a cache device, a gaming server, or a load balancer device. In such examples, the virtual machine may be assigned a corresponding profile type based on the analysis.

In addition to the example profile types noted above, such as a VOIP server profile, a web server profile, a database server profile, an application profile, a web proxy device profile, a gaming server profile, a cache device profile, and a load balancer profile, other profile types may be stored (along with corresponding resource usage amounts, patterns, and thresholds defining virtual machines in the profile) in other examples. Further, a resource usage monitoring system 630 or other system components may dynamically create new profile types based on resource usage patterns observed in virtual machines on cloud systems. New profile types may apply to virtual machines associated with particular customers or in particular zones, or may apply across multiple customers and/or zones. For example, if resource usage monitor 630 observes a set of virtual machines exhibiting the same resource usage patterns over a period of time within the cloud computing environment, the resource usage monitor 630 may identify the pattern as a new profile and determine the profile parameters (e.g., usage amounts of various resources, patterns of changes in resource usage, and minimum/maximum thresholds that define the limits of the profile) and create a new profile type. These automatically derived profiles may be detected and stored by the resource usage monitor 630, and then may be used to identify virtual machines as belonging to those profiles, without needing to understand the real-world usage of the virtual machines in the profile type. Other profile types may correspond to resource usage levels indicating that a virtual machine that is operating within or is exceeding the acceptable bounds of a service level agreement (SLA) between the cloud system and the customer (e.g., SLA-based profiles). Additionally, as discussed below, certain patterns of resource usage may indicate a virtual machine may have been compromised by malware. Therefore, profile types also may include one or more malware profile types corresponding to resource usage patterns for virtual machines compromised by specific malware programs and/or botnets. (e.g., Malware A profile, Malware B profile, Botnet A profile, etc.)

Returning to the example table of FIG. 8B, the anticipated future resource usage of each of the virtual machines VM1-VM4 is also included. The anticipated future resource usage may be based on the current resource usage of the virtual machine, as well as the determined virtual machine profile and/or size. For example, if the resource usage monitoring system 630 determines that a virtual machine is being used as a web server, it may anticipate relatively minor changes in processor and memory usage, but large changes in anticipated bandwidth usage as the hosted web site gains popularity in the future. Similarly, if the resource usage monitoring system 630 determines that a virtual machine is a database server, it may anticipate a large increase in the amount of cache and/or disk space needed by the database server as the database grows in the future.

The profiling of a virtual machine and the determination of the virtual machine's anticipated future resource usage in step 702 may be based only on the current and previous resource usage data for the virtual machine, or may be based on additional data such as resource usage data for related virtual machines and information known about the virtual machine customer. Customers in the cloud computing environment may purchase a number of virtual machines from the cloud provider, and at the time of the purchase may provide desired specifications or capabilities for their virtual machines and/or may provide some information about their business or planned virtual machine usage. For example, a customer may purchase a package of virtual machines designed for a small-business enterprise, including a number of web servers, a number of application servers, and a number of database servers. In this example, a resource usage monitor may determine which of the customer's virtual machines are being used for which purposes, and may determine the anticipated future resource usage for the customer's virtual machines based on the resource usage of all of the customer's virtual machines. For instance, certain high resource usage levels for one of the customer's database servers may indicate that the customer's other database servers or other virtual machines (e.g., web servers, caches) are more likely to use additional resources in the future. As another example, a cloud system customer may indicate a business size, business type, or business model (e.g., corporate web site, small business web-hosting, search engine, video streaming, online file storage and transfer, etc.) when purchasing a set of virtual machines, and a resource usage monitor may use the customer's business size, type and/or business model to determine virtual machine profiles and anticipate future resource usage for the customer's virtual machines.

As described above, in this example, the resource usage monitoring system 630 may profile individual virtual machines (or groups of virtual machines) and may use the determined profiles to anticipate the future physical resource usage by the virtual machines. However, in other examples, a resource usage monitoring system 630 need not determine profiles or classifications for virtual machines in order to anticipate the virtual machine's future resource usage. For example, a resource usage monitor 630 may determine future resource usage for a virtual machine based on the current resource usage trends for that virtual machine, without determining a virtual machine profile. In other examples, a resource usage monitoring system 630 need not perform any determinations to anticipate the future physical resource usage of the virtual machines in the cloud computing environment. In such examples, the dynamic configurations of virtual machines and virtualization servers (or host servers) and other components may be based on the current resource usage of the virtual machines, rather than anticipated future resource usage.

In step 703, a resource manager 512, resource usage monitor 515 or 615, and/or other management component with the cloud system, may retrieve resource capacity data for the virtualization servers (or hosts) and the other physical resources within the cloud computing environment. For example, the resource manager 512 may retrieve processing capability data for each physical processor 408 within each virtualization server 401 in the cloud system. Similarly, available memory data may be retrieved for each physical disk 404, and resource availability may be retrieved for each network resource and/or device, as well as for any other physical devices 406 within the cloud computing environment.

As discussed below, a dynamic configuration of virtual machines and/or virtualization servers may occur within a single virtualization server or across multiple virtualization servers. Additionally, in some examples, multiple virtual machines, hosts, and other resources may be dynamically configured within a single availability zones (or physical data center locations), while in other examples, virtual machines, hosts, and other resources may be dynamically configured across multiple different zones. Accordingly, the data retrieved in step 703 may correspond to the scope of the virtual machines, hosts and other physical resources to be dynamically configured.

In step 704, one or more configurations may be determined for executing the virtual machines using the physical resources in the cloud computing environment. The virtual machine and cloud resource configurations determined in step 704 may include, for example, matching virtual machines to virtualization servers, allocating different physical resources to virtual machines, and configuring individual virtual machines and virtualization servers in the cloud system. Such configurations may be based on comparisons between the current and/or anticipated resource usage of the virtual machines executing in the cloud, and the capabilities of the physical resources available in the cloud computing environment.

Referring to FIGS. 9A and 9B, in certain examples a resource manager or other cloud component may match a set of virtual machines for which resource usage data was received in step 701, to a set of physical resources for which resource capacity data was retrieved in step 703. In FIG. 9A, four virtualization servers 910-940 are shown, each including example graphical data corresponding to the sets of virtual machines 950-963 executing respectively within the virtualization servers 910-940. In this example, virtualization servers 910 and 940 have each been assigned four virtual machines, and virtualization servers 920 and 930 have each been assigned three virtual machines. However, the example usage data shown for the physical resources (processor usage, graphics processor usage, memory usage, network bandwidth usage, and gateway usage) for each virtual machine 950-963 indicates that the assignment of virtual machines 950-963 to virtualization servers 910-940 may be inefficient in FIG. 9A. For instance, the virtual machines 950-953 executing on virtualization server 910 all have relatively high CPU usage levels, as compared to the average CPU usage levels of the virtual machines executing on the other virtualization servers. Similarly, the virtual machines 957-959 on virtualization server 930 all have relatively high memory usage, and the virtual machines 960-953 executing on virtualization server 940 have relatively high network bandwidth usage. Thus, as a result of the allocation of virtual machines 950-963 to virtualization servers 910-940 in FIG. 9A, virtual machines 950-953 might not be provided sufficient processor capacity, virtual machines 957-959 might not be provided sufficient disk storage, and virtual machines 960-963 might not be provided sufficient bandwidth.

The dotted lines in FIG. 9A represent a possible dynamic reconfiguration of the virtualization servers 910-940 and virtual machines 950-963 that may allow for a more efficient use of the physical resources within the cloud system. By summing the usage data for different physical resources across multiple virtual machines on a virtualization server, and comparing that usage data to the capacities of the virtualization server and other virtualization servers, the resource manager system or other cloud component may determine a matching of virtual machines 950-963 to virtualization servers 910-940 that may better use the cloud's physical resources to support the virtual machines. In this example, virtual machines 952 and 957 may be moved (or reallocated) between virtualization servers 910 and 930, virtual machines 953 and 960 may be reallocated between virtualization servers 910 and 940, and virtual machine 962 may be moved from virtualization server 940 to virtualization server 930.

FIG. 9B shows the updated distribution of virtual machines 950-963 after the reallocations illustrated in FIG. 9A. In this example, the allocation of virtual machines 950-963 in FIG. 9B may be more efficient than the allocation shown in FIG. 9A, in that the CPU-intensive virtual machines have been reallocated among different virtualization servers rather than residing on the same virtualization server 910. Similarly, a high memory usage virtual machine 957 was moved from virtualization server 930 to virtualization server 910, thereby freeing up memory in server 930 to better accommodate the other high memory usage virtual machines 958 and 959. Additionally, two high bandwidth usage virtual machines 960 and 962 were moved from virtualization server 940 to other servers, thereby freeing up network bandwidth on virtualization server 940 for the other high bandwidth usage virtual machines 961 and 963.

In the examples illustrated in FIGS. 9A and 9B, the resource usage data received and analyzed for the virtual machines 950-963 includes processor usage data (CPU, and GPU), memory usage data (Mem), network bandwidth usage data (BW), and gateway usage data (GW). However, in other examples, other types of usage data corresponding to usage amounts or statistics for any of the cloud physical resources discussed herein may be received and analyzed to determine virtual machine and virtualization server configurations in step 704. Further, the resource usage data in this and other examples may correspond to actual current or previous resource usage data, or may correspond to anticipated resource usage data for virtual machines, as discussed above in step 702.

Other types of configurations may be determined in step 704, instead of or in addition to the matching of virtual machines to virtualization servers (or hosts). For example, a resource usage monitor system 630 or other component in a cloud system may determine one or more configurations for the virtual machines, hosts, and/or other physical resources, in which the virtual machines are not moved to different hosts. Virtualization servers and other physical resources in the cloud computing environment may be reconfigured to support different sets of virtual machines, or to provide different amounts of resources to virtual machines. For instance, if a resource usage monitor determines that a first virtual machine on a virtualization server requires a large amount of processor capacity, and determines the other virtual machines on the same server are not using their share of processing power, then the virtualization server may be configured to increase the processor capacity granted to the first virtual machine (e.g., by changing the number of CPU's that the first virtual machine can access within the virtualization server). As another example, if a first virtual machine on a virtualization server is a virtual web server that requires a large amount of bandwidth (e.g., 10 GB) and a low network latency, the system may reconfigure the network traffic policies in the cloud computing environment (e.g., by reconfiguring one or more network devices in the cloud) to guarantee the first virtual machine its required amount of bandwidth and low network latency. In this case, the other virtual machines executing on the same virtualization server (or on other virtualization servers) may be required to share the remaining available bandwidth and may potentially incur higher network latency. In other examples, any of the physical resources discussed herein potentially may be configured to better support the virtual machines executing within the cloud system.

In step 705, another determination may be performed regarding whether or not the virtual machines and hosts in the cloud computing environment should be dynamically reconfigured in accordance with the configuration determined in step 704. That is, even though a potentially more efficient allocation or configuration of cloud resources may have been determined in step 704 (e.g., a matching of virtual machines to hosts, a reconfiguration of a host server or other physical resources), the cloud management system may decide that the determined reconfiguration should not be performed immediately. For example, even a dynamic reconfiguration of the physical resources in the cloud that would be more efficient for all virtual machines as a whole, may negatively affect the performance of some virtual machines executing in the cloud. Accordingly, components within virtualization servers and/or cloud management systems may be configured to automatically reconfigure the virtual machines and hosts in the cloud computing environment (705: Yes), or alternatively may be configured not to automatically reconfigure the virtual machines or hosts until one or more additional checks or notifications is performed (705: No).

If a virtualization server, cloud management server, and/or other cloud components are configured not to automatically reconfigure virtual machines and/or hosts (705: No), then in step 706 the cloud management system may be configured to contact one or more customers with virtual machines executing within the cloud with offers and/or notifications regarding the potential dynamic reconfigurations determined in step 704. Customers may be contacted automatically (e.g., by email or via a cloud management console application) with an offer or notification regarding the potential dynamic reconfiguration of the cloud resources. For example, a customer may have a service level agreement (SLA) or other contract with the cloud provider that specifies the amount of cloud resources or level of performance (e.g., processing capacity, memory, network bandwidth, etc.) that will be guaranteed by the cloud provider for the customer's virtual machines. In this case, if a cloud management server determines that the customer's virtual machines are not operating efficiently and/or could perform better with the allocation of additional resources, the cloud management server may contact the customer to offer the additional resources for the customer's virtual machines for an additional price. For instance, the cloud management server may calculate the difference between the anticipated future resource usage levels for the customer's virtual machines and the corresponding resource capacity levels available for customer's virtual machines. If the difference between available resource capacity levels and the resource usage levels for the customer's virtual machines is greater than a predetermined threshold amount (e.g., any resource deficiency, a 5% resource deficiency, a 10% resource deficiency, etc.) then the cloud management server may be configured to offer the additional resources to the customer. As another example, if the cloud management server determines that the customer's SLA or contract requires the allocation of unnecessary physical resources or an unnecessarily high performance level for the customer's virtual machines, based on the resource usage data for the customer's virtual machines, then the cloud management server may contact the customer to offer a reduced resource package or performance level at a discount, thereby saving money for the customer and freeing up the unused resources in the cloud to service other customer's virtual machines.

In other examples, a cloud management server may provide notifications to customers in step 706 that inform the customers of changes in the resource usage levels of the customer's virtual machines. For instance, significant changes in the resource usage levels of a virtual machine may indicate a software bug or security issue, such as a virtual machine that is malfunctioning or has been compromised by malware. Such performance or security issues may be brought to the attention of the customer via a notification in step 706. Therefore, in certain embodiments, a resource usage monitor may be configured to detect changes in virtual machine resource usage by comparing the resource usage data received in step 701 to the corresponding usage data previously received for the same virtual machines. In some embodiments, when significant changes are detected for a virtual machine, the cloud management system may be configured not to perform steps 702-705, but rather to directly notify the customer in step 706 of the potential performance or security issue.

Additionally, certain patterns of resource usage (or patterns in changes of resource usage) may be associated with specific malware programs and/or botnets. For instance, the cloud management server may compare a resource usage pattern to one or more malware profiles (e.g., sets of previously observed and classified patterns), to determine that a specific malware program is likely operating on a virtual machine or that the virtual machine has likely become part of a specific botnet (e.g., a collection of computers that have been compromised by malware to perform coordinated or related tasks). If a specific malware program or botnet is identified, then an appropriate course of action may be performed in step 706, such as notifying the customer and suggesting the appropriate repairs and/or countermeasures for the specific malware or botnet, automatically disabling and/or quarantining the infected virtual machine, and initiating the repairs or countermeasures for the malware or botnet.

As noted above, certain cloud management systems may be configured to automatically perform dynamic reconfigurations of the virtual machines, hosts, and other physical resources in the cloud computing environment (705: Yes). Such dynamic configurations may be performed without interfering with the operation of the virtual machines executing in the cloud system, and may be transparent to the cloud customers. If the cloud management system is configured to automatically perform dynamic configurations (705: Yes), or if the customer has been offered or notified of the reconfiguration in step 706 (and has approved of the configuration, if approval is required), then in step 707 the virtual machines, virtualization servers, and other cloud resources may be reconfigured and/or reallocated in accordance with any configurations determined in step 704. As discussed above, such reconfigurations and reallocations may include moving one or more virtual machines to different host servers (as illustrated in FIGS. 9A and 9B), or may include configuring (or tuning) host servers and other physical resources in the cloud computing environment to operate more efficiently for the virtual machines executing within the cloud system.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. One or more non-transitory computer-readable media storing computer-executable instructions that, when executed by a processor, cause a computing device to:
   determine a virtual machine profile for a virtual machine running on a host server in a cloud computing environment;
   determine one or more resource requirements of the virtual machine;
   determine one or more resource capacity amounts available on the host server for the virtual machine in the cloud computing environment;
   determine whether the one or more resource capacity amounts available on the host server meet the one or more resource requirements of the virtual machine;
   if the one or more resource capacity amounts available on the host server do not meet the one or more resource requirements of the virtual machine, allocate different resources of the cloud computing environment to the virtual machine;
   receive one or more resource usage amounts for a plurality of virtual machines in the cloud computing environment;
   identify a pattern among the one or more resource usage amounts for the plurality of virtual machines in the cloud computing environment over a period of time; and
   create a new virtual machine profile type based on the identified pattern among the one or more resource usage amounts for the plurality of virtual machines in the cloud computing environment.

2. The one or more non-transitory computer-readable media of claim 1, wherein allocating the different resources of the cloud computing environment comprises moving the virtual machine from the host server to a different host server in the cloud computing environment.

3. The one or more non-transitory computer-readable media of claim 1, storing further computer-executable instructions that, when executed by the processor, cause the computing device to:
   receive a plurality of resource usage data comprising a graphics processor usage amount for each of a plurality of different virtual machines running in the cloud computing environment;
   receive a plurality of resource capacity data comprising a graphics processor capacity amount for a plurality of different host servers in the cloud computing environment;
   analyze the plurality of resource usage data and the plurality of resource capacity data; and
   match each of the plurality of different virtual machines to one of the plurality of different host servers based on analyzing the plurality of resource usage data and the plurality of resource capacity data.

4. The one or more non-transitory computer-readable media of claim 3, wherein the plurality of resource usage data received comprises network bandwidth usage data, network hardware usage data, central processing unit (CPU) usage data, storage usage data, and memory usage data for each of the plurality of different virtual machines.

5. The one or more non-transitory computer-readable media of claim 1, wherein allocating the different resources of the cloud computing environment comprises reconfiguring one or more network traffic policies in the cloud computing environment.

6. The one or more non-transitory computer-readable media of claim 1, wherein allocating the different resources of the cloud computing environment comprises allocating additional resources of the host server to the virtual machine.

7. The one or more non-transitory computer-readable media of claim 1, storing further computer-executable instructions that, when executed by the processor, cause the computing device to:
   receive a first set of resource usage data for the virtual machine;
   determine the virtual machine profile for the virtual machine based on the first set of resource usage data; and
   determine anticipated resource usage data for the virtual machine based on the determined virtual machine profile.

8. The one or more non-transitory computer-readable media of claim 1, wherein the virtual machine profile comprises one of: a voice over Internet Protocol (VoIP) server profile, a web server profile, a database server profile, an application profile, a web proxy device profile, a gaming server profile, a cache device profile, a malware profile, and a botnet profile.

9. The one or more non-transitory computer-readable media of claim 7, storing further computer-executable instructions that, when executed by the processor, cause the computing device to:
receive a second set of resource usage data for the virtual machine, the second set of resource usage data corresponding to a second period of time after a first period of time associated with the first set of resource usage data;
compare the second set of resource usage data to the anticipated resource usage data for the virtual machine; and
transmit a notification to a user device associated with the virtual machine, based on comparing the second set of resource usage data to the anticipated resource usage data for the virtual machine.

10. The one or more non-transitory computer-readable media of claim 1, storing further computer-executable instructions that, when executed by the processor, cause the computing device to:
calculate at least one resource deficiency value as a difference between a resource usage level for the virtual machine and a corresponding resource capacity level available for the virtual machine;
compare the at least one resource deficiency value to a resource deficiency threshold; and
when the at least one resource deficiency value exceeds the resource deficiency threshold, determine an additional resource offering and provide the additional resource offering to a user device associated with the virtual machine.

11. The one or more non-transitory computer-readable media of claim 1, storing further computer-executable instructions that, when executed by the processor, cause the computing device to:
determine one or more usage amounts of the virtual machine;
add an identifier of the virtual machine and the one or more usage amounts of the virtual machine to a first table comprising resource usage data for the plurality of virtual machines in the cloud computing environment; and
analyze the plurality of virtual machines in the cloud computing environment, using the first table, to determine a second table comprising respective predicted resource requirements of each of the plurality of virtual machines in the cloud computing environment.

12. The one or more non-transitory computer-readable media of claim 1, storing further computer-executable instructions that, when executed by the processor, cause the computing device to:
calculate the one or more resource requirements of the virtual machine based on the virtual machine profile for the virtual machine and one or more resource usage amounts of the virtual machine.

13. The one or more non-transitory computer-readable media of claim 1, wherein parameters of the virtual machine profile for the virtual machine comprise usage amounts of one or more physical resources of the host server, patterns of change in the usage amounts of the one or more physical resources of the host server, a minimum resource requirement threshold, and a maximum resource usage threshold.

14. The one or more non-transitory computer-readable media of claim 1, storing further computer-executable instructions that, when executed by the processor, cause the computing device to:
determine that the virtual machine running on the host server is subject to a guaranteed performance level for the virtual machine; and
determine that a different virtual machine running on the host server is not subject to a guaranteed performance level for the different virtual machine,
wherein allocating the different resources of the cloud computing environment to the virtual machine comprises allocating sufficient resources to the virtual machine to meet the guaranteed performance level for the virtual machine.

15. The one or more non-transitory computer-readable media of claim 1, wherein the virtual machine is configured to run a web server, and wherein the one or more non-transitory computer-readable media store further computer-executable instructions that, when executed by the processor, cause the computing device to:
determine an increased popularity of a web site hosted by the web server,
wherein allocating different resources of the cloud computing environment to the virtual machine comprises allocating additional network bandwidth to the virtual machine based on the increased popularity of the web site hosted by the web server.

16. A method, comprising:
monitoring one or more resource usage amounts of a virtual machine running on a host server in a cloud computing environment;
determining a virtual machine profile for the virtual machine running on the host server based on the monitored one or more resource usage amounts of the virtual machine;
determining one or more resource capacity amounts available on the host server for the virtual machine running on the host server in the cloud computing environment;
dynamically adjusting the one or more resource capacity amounts available on the host server for the virtual machine based on the virtual machine profile for the virtual machine, to allocate different resources of the cloud computing environment to the virtual machine;
receiving one or more resource usage amounts for a plurality of virtual machines in the cloud computing environment;
identifying a pattern among the one or more resource usage amounts for the plurality of virtual machines in the cloud computing environment over a period of time; and
creating a new virtual machine profile type based on the identified pattern among the one or more resource usage amounts for the plurality of virtual machines in the cloud computing environment.

17. The method of claim 16, wherein parameters of the virtual machine profile for the virtual machine comprise usage amounts of one or more physical resources of the host server, patterns of change in the usage amounts of the one or more physical resources of the host server, a minimum resource requirement threshold, and a maximum resource usage threshold.

18. A system comprising:
a plurality of virtualization servers, each virtualization server of the plurality of virtualization servers comprising a hypervisor and a hardware layer having one or more physical processors, and each virtualization server of the plurality of virtualization servers being configured to execute a plurality of virtual machines;
a plurality of physical storage resources;
a plurality of physical network resources; and
a cloud-management server comprising a processor and memory storing computer-readable instructions that, when executed, cause the cloud-management server to:

receive resource usage data from the plurality of virtual machines, the resource usage data comprising usage amounts of the one or more physical processors, the plurality of physical storage resources, and the plurality of physical network resources for each of the plurality of virtual machines executing in the system;

determine a virtual machine profile for each of the plurality of virtual machines executing in the system;

receive resource capacity data from the plurality of virtualization servers, the plurality of physical storage resources, and the plurality of physical network resources;

determine a configuration for each of the plurality of virtual machines based on a virtual machine profile for each of the plurality of virtual machines, each configuration identifying a virtualization server, one or more of the one or more physical processors, one or more of the plurality of physical storage resources, and one or more of the plurality of physical network resources for a respective virtual machine;

adjust the configuration for at least one of the plurality of virtual machines based on a virtual machine profile for the at least one of the plurality of virtual machines, resource usage data for the at least one of the plurality of virtual machines, and resource capacity data for resources used by the at least one of the plurality of virtual machines;

receive one or more resource usage amounts for the plurality of virtual machines;

identify a pattern among the one or more resource usage amounts for the plurality of virtual machines over a period of time; and create a new virtual machine profile type based on the identified pattern among the one or more resource usage amounts for the plurality of virtual machines.

19. The system of claim 18, wherein each virtualization server of the plurality of virtualization servers comprises a resource usage monitor configured to:

directly monitor the plurality of physical storage resources;

directly monitor the plurality of physical network resources;

identify which of the plurality of virtual machines are using which physical storage resources of the plurality of physical storage resources; and identify which of the plurality of virtual machines are using which physical network resources of the plurality of physical network resources.

20. The system of claim 18, wherein parameters of the virtual machine profile for the virtual machine comprise usage amounts of one or more physical resources of a virtualization server, patterns of change in the usage amounts of the one or more physical resources of the virtualization server, a minimum resource requirement threshold, and a maximum resource usage threshold.

* * * * *